US005220330A

United States Patent [19]

Salvail et al.

[11] Patent Number: 5,220,330

[45] Date of Patent: Jun. 15, 1993

[54] BROADBAND CONFORMAL INCLINED SLOTLINE ANTENNA ARRAY

[75] Inventors: Gary Salvail, Camarillo; Steven W. Bartley, Thousand Oaks, both of Calif.

[73] Assignee: Hughes Aircraft Company, Los Angeles, Calif.

[21] Appl. No.: 787,344

[22] Filed: Nov. 4, 1991

[51] Int. Cl.[5] .............. G01S 13/00

[52] U.S. Cl. .............. 342/62; 343/705; 343/786; 342/374

[58] Field of Search .............. 342/62, 374, 373; 343/700 MS, 705, 708, 786, 772, 770

[56] References Cited

U.S. PATENT DOCUMENTS 3,373,430 3/1968 Croswell et al. .............. 343/708
4,101,895 7/1978 Jones, Jr. .............. 343/708
4,125,839 11/1978 Kaloi .............. 343/700 MS
4,287,518 9/1981 Ellis, Jr. .............. 343/700 MS
4,843,403 6/1989 Lalezari et al. .............. 343/767
4,980,692 12/1990 Rudish et al. .............. 343/700 MS
5,070,339 12/1991 Chu et al. .............. 343/700 MS

*Primary Examiner*—Theodore M. Blum
*Attorney, Agent, or Firm*—Charles D. Brown; Randall M. Heald; Wanda K. Densow-Low

[57] ABSTRACT

A missile guidance antenna that is conformal to the missile surface, dual-polarized and broadband. Slotline notch array elements (30, 52) are inclined toward boresight for both the E and H-planes. This inclination directs a greater portion of the energy toward the front of the missile. The additional energy directed forward reduces the nullifying effects of the metallic skin on the tangential E-field and enhances the performance of the other polarization. The slotline elements (30, 52) can be packed with spacing close enough to allow for electronic beam steering without creating grating lobes in the field at the highest frequency of operation.

25 Claims, 8 Drawing Sheets

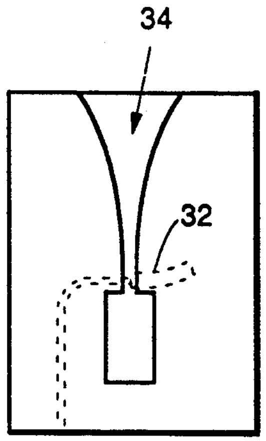
FIG. 1.
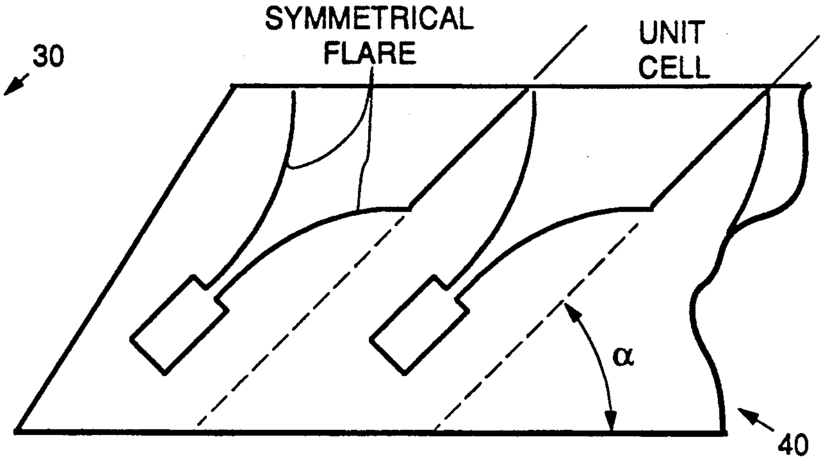
FIG. 4
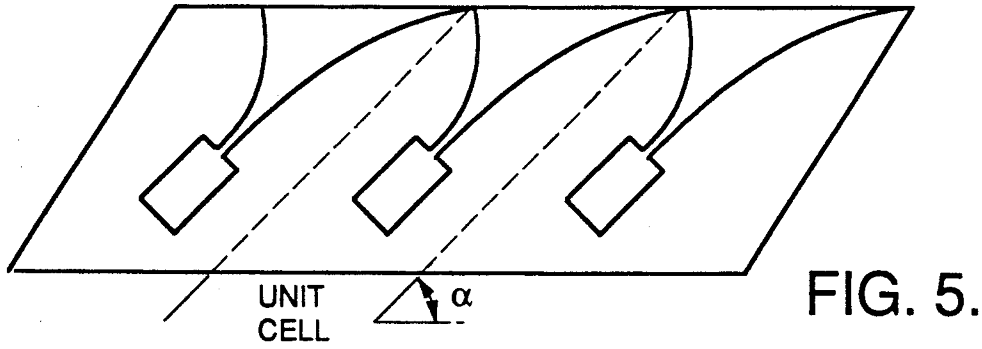
FIG. 5.
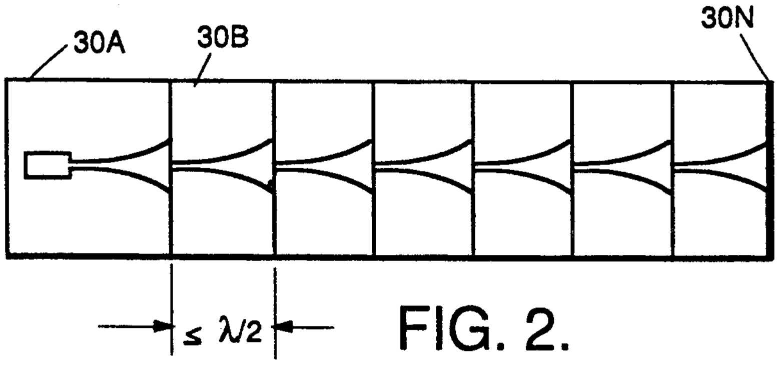
FIG. 2.
FIG.3.
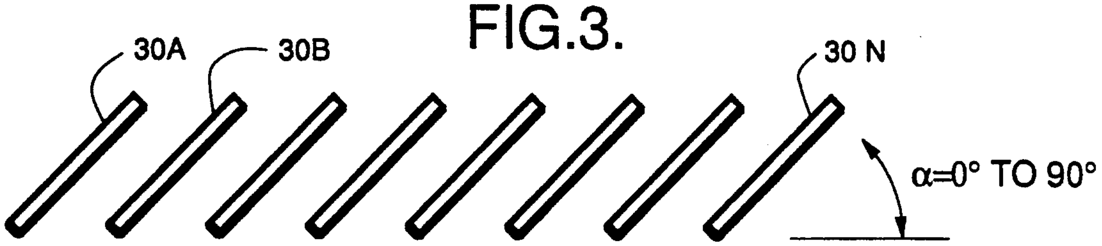

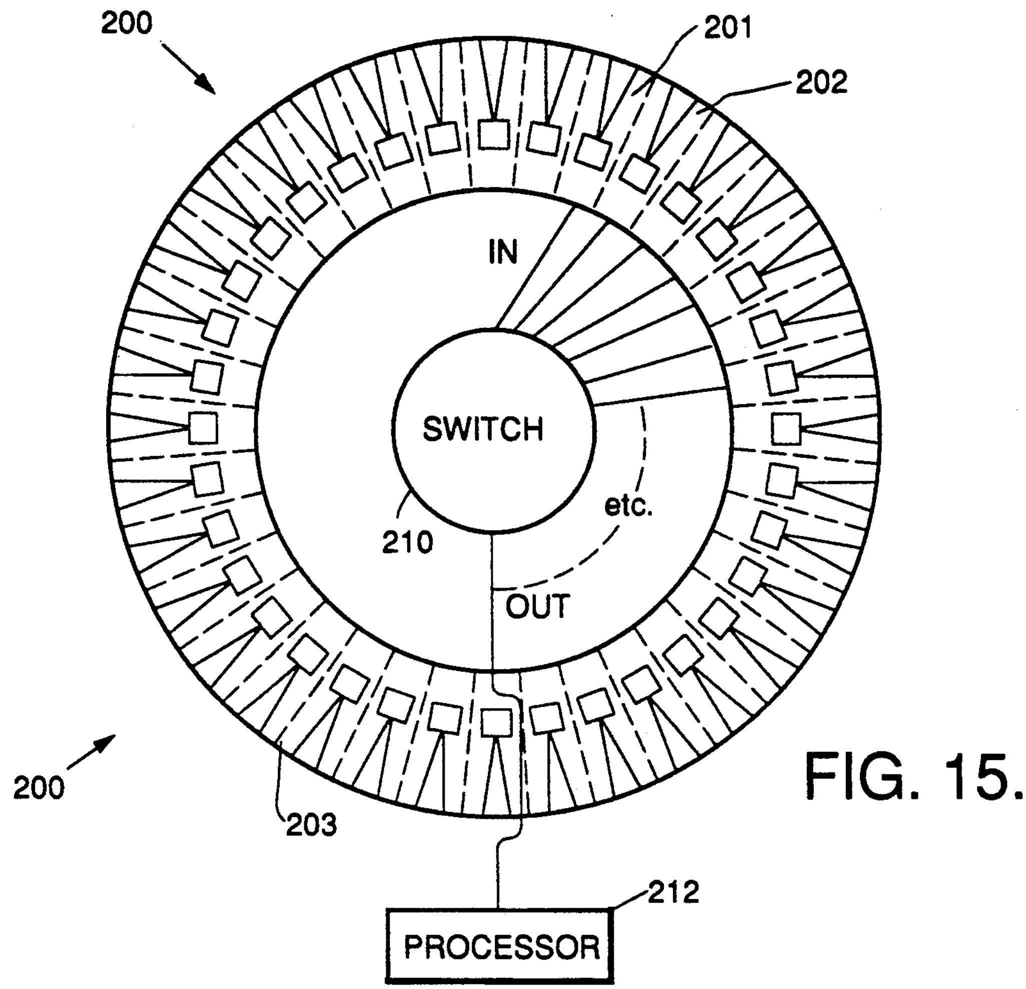
FIG. 15.
FIG. 16.
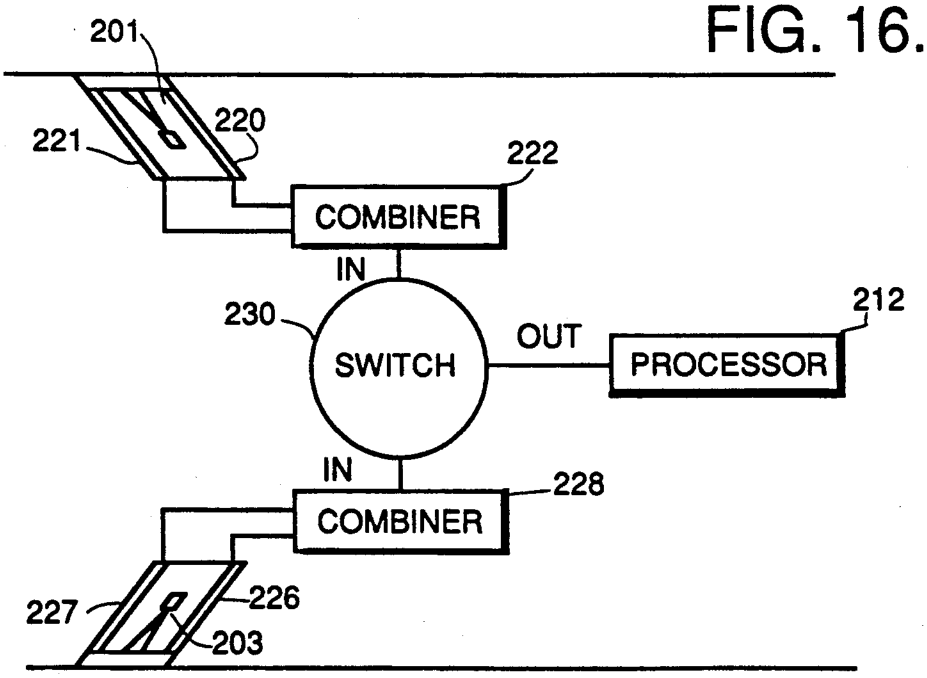

BROADBAND CONFORMAL INCLINED SLOTLINE ANTENNA ARRAY

BACKGROUND OF THE INVENTION

The present invention relates to antenna arrays, and more particularly to conformal arrays useful for missile applications.

U.S. Pat. No. 5,023,623, entitled "Dual Mode Antenna Apparatus Having Slotted Waveguide and Broadband Arrays," by Donald E. Kreinheder et al., the entire contents of which are incorporated herein by this reference, provides a description of conventional missile target detection and tracking systems. Briefly, one type of target tracking system is known as broadband anti-radiation homing (ARH). Such a system is passive, and tracks a target by receiving radiation emitted by the target.

Known conformal arrays for missiles employ conformal slot radiators and microstrip patch radiators. These antennas are narrow band, and because of their physical and/or electrical characteristics they can not be inclined to enhance their forward radiation. The result is a limited field of view.

Conventional conformal mounting situates the antenna elements so they face normal to the missile surface resulting in poor radiation in the forward direction. This is because the antenna is situated so that the greatest amount of energy from each element is directed normally to the missile body. This makes radiation in the forward direction difficult. The problem is made worse for elements radiating with an E-field tangential to the metallic missile body. The metal surface will not support these fields and forces them to zero at the point of contact. This is a major problem for conformal arrays since their "view" to missile boresight is tangential from the cylindrical section and nearly tangential in the nose region.

It is an object of the present invention to provide an ARH missile guidance antenna that is conformal to the missile surface, is dual-polarized, and broadband.

Another object is to provide a conformal antenna array for a missile that will sense RF radiation over the forward hemisphere.

SUMMARY OF THE INVENTION

An array in accordance with the invention uses broadband antenna elements with both the E and the H-plane elements inclined toward boresight to improve directivity in that direction. This offsets the nullifying effects of the metallic skin in the H-plane as well as enhances the performance of the E-plane. Tilting the elements also makes the antenna more compact which helps in adapting it to conformal use.

The antenna uses slotline (notch) elements which have a flat profile. These elements are suitable for close packing in both the E and H-planes to prevent grating lobes in the antennas' field of view while the antenna is scanned to boresight. Slotline (notch) elements are broadband with greater than three-to-one bandwidths being achieved. Dual polarization is accomplished by combining the E and H-plane elements in a linear or circumferential manner. A single or dual polarized array can be mounted on the cylinder section, on the nose, or radially around the missile body. In the radial configuration, the elements still incline in the boresight direction. Any combination of array positions is possible. The slotline elements can be packed with spacing close enough to allow for electronic beam steering without creating grating lobes at the highest frequency of operation.

BRIEF DESCRIPTION OF THE DRAWING

These and other features and advantages of the present invention will become more apparent from the following detailed description of an exemplary embodiment thereof, as illustrated in the accompanying drawings, in which:

FIG. illustrates a conventional tapered slotline antenna element.

FIGS. 2 and 3 are respective top and side views of an H-plane array wherein the elements are inclined toward boresight in accordance with the invention.

FIG. 4 illustrates a tapered notch inclined element array of symmetrical E-plane elements.

FIG. 5 illustrates a tapered notch inclined element array of asymmetrical E-plane elements.

FIG. 15 illustrates the interconnection of the E-plane elements of a circumferential array embodying the invention.

FIG. 16 illustrates the interconnection of the H-plane elements of a circumferential array embodying the invention.

DETAILED DESCRIPTION OF THE PREFERRED EMBODIMENT

Figure 6:
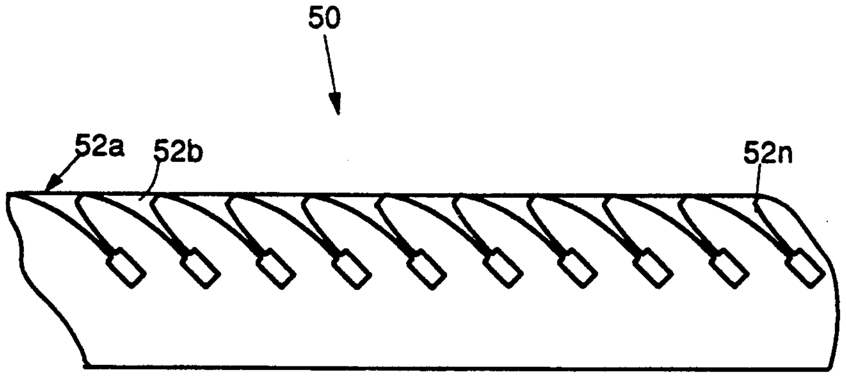
FIG. 6 illustrates a linear array of inclined E-plane elements with modified tapers to accommodate the inclination.

The invention employs the tapered slotline antenna element sometimes referred to as a tapered notch element. FIG. 1 illustrates an unmodified slotline 30. A compensated feed 32 transitions energy to a flared dielectric notch 34 which launches the energy to free space.

As in the antenna of U.S. Pat. No. 5,023,623, an array embodying the present invention employs a plurality of tapered notch antenna elements to comprise the antenna array. To enhance directivity toward boresight, however, the antenna elements are inclined in accordance with the invention. Any inclination angle between 0 and 90 degrees may be used in accordance with the invention, although 30° and 90° are preferred inclination angles. The inclination is illustrated for a typical H-plane array in the top view of FIG. 2 and the edge view of FIG. 3. Here a plurality of tapered notch radiator elements 30A, 30B, . . . 30N are arranged in a spaced, parallel relationship. Instead of each radiator being set at a perpendicular with respect to the same reference horizontal line, as in the conventional array of tapered notch radiator elements, the respective elements are inclined by an inclination angle $\alpha$ which is less than 90°, and typically 30° or 45°. The spacing between adjacent edges of the inclined radiator elements is less than or equal to $\lambda_h/2$, where $\lambda_h$ is the shortest wavelength of operation of the array. If the spacing is greater than $\lambda_h/2$, undesirable grating lobes can be formed at the higher frequencies of operation. The desired spacing and inclination angle of the H-plane elements is obtained with fixturing, i.e., the rigid structural frame which holds the antenna elements in position and fastens the elements to the missile body.

In the E-plane, the conventional tapered slotline elements, such as are used in the array of U.S. Pat. No. 5,023,623, require modification in order to incline them toward boresight. Symmetrical or asymmetrical embodiments for the tapered regions of the slotline radiators can be employed. The asymmetrical flared notch elements can fit more easily into an inclined profile, and can be spaced more compactly so the $\lambda_n/2$ spacing rule is not broken. However, asymmetrical elements provide a poorer match into the antenna causing higher VSWR and a reduction in the antenna's efficiency. Symmetrical flared notch elements present a better match (lower VSWR) and therefore provide a higher antenna efficiency. However, the symmetry limits the inclination angle of the array toward boresight and limits the close packing needed to maintain the $\lambda_n/2$ spacing.

FIG. 4 illustrates a tapered notch inclined element array 40 of a plurality of adjacent elements formed on the same dielectric substrate. Here the flaring on either side of the notch is symmetrical while each element is inclined by an angle $\alpha$ from the horizontal.

FIG. 5 illustrates an array of E-plane elements 45 which are also inclined by angle $\alpha$, but wherein the flaring on the respective sides of the notch is asymmetrical.

FIG. 6 illustrates a linear array 50 comprising a plurality of asymmetrical E-plane elements 52A–52N with modified tapers to accommodate the inclination.

The antenna elements may be fabricated using conventional techniques to build flared notch stripline antenna elements. Each element is typically fabricated from a dielectric substrate board initially clad with copper layers on each surface. The board may comprise, for example, fiberglass reinforced Teflon. The copper layer on one surface is partially etched away to form the flared notch; the copper surface on the opposite layer is selectively etched to form the balun circuit and feed network. Further details of the manner of construction may be found in U.S. Pat. No. 5,023,623.

Figure 7:
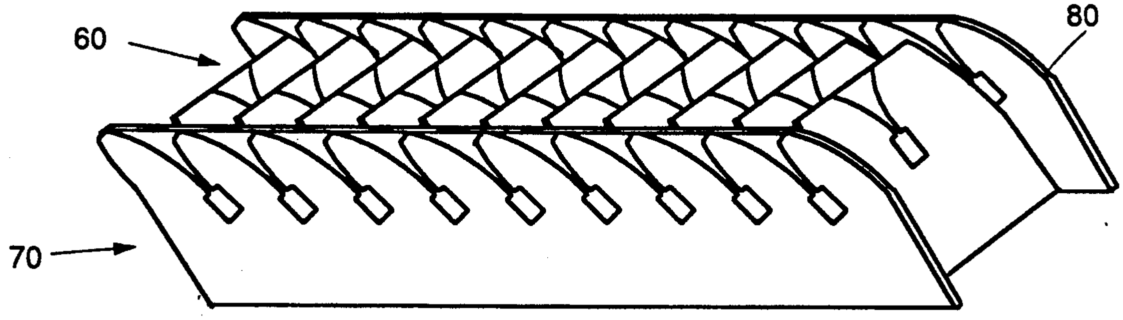
FIG. 7 illustrates a dual polarization antenna employing two inclined E-plane arrays flanking one inclined H-plane array in accordance with the invention.
Figure 8:
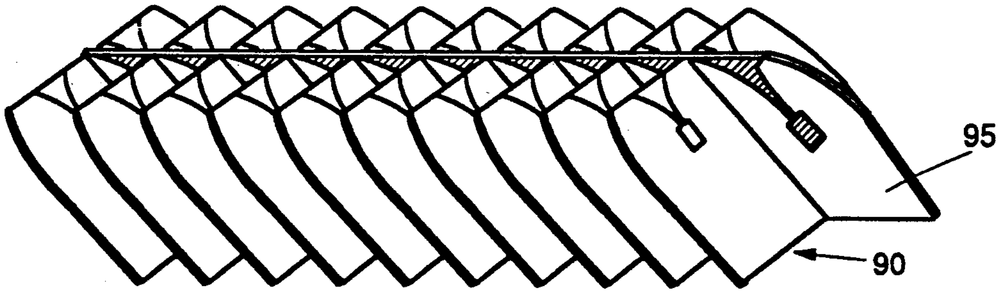
FIG. 8 illustrates another embodiment of a dual polarization antenna in accordance with the invention, employing a pair of inclined H-plane elements on each inclined card, with the inclined elements of the E-plane array positioned between them.

There are at least two approaches to dual polarization for the linear array employing inclined radiator elements in accordance with the invention. One approach, illustrated in FIG. 7, employs an inclined H-plane array 60 flanked on both sides by inclined E-plane arrays 70 and 80. Another approach, illustrated in FIG. 8, comprises an inclined H-plane array 90 of double slotline elements, i.e., each inclined array element includes a pair of tapered notch elements. An inclined E-plane array 95 is positioned along the center line of the inclined H-plane array 90, between the pairs of the H-plane radiator elements.

Figure 10:
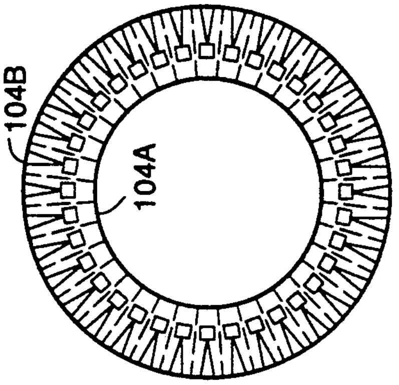
FIGS. 9–11 illustrate a circumferential array of inclined E and H-plane elements of a conformal antenna in a missile in accordance with the invention.
Figure 9:
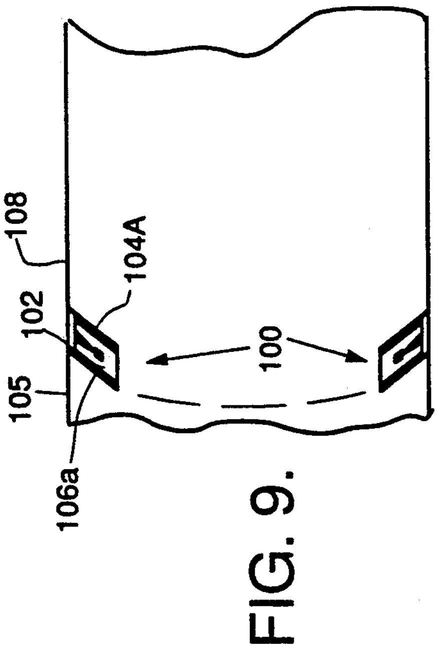

A circumferential array 100 of inclined E and H-plane elements in accordance with the invention and mounted within a missile body 105 is shown in FIG. 9. In this array, as described above with respect to FIGS. 7 and 8, the elements of both the E-plane and H-plane array are inclined toward boresight. Element 102 is an exemplary H-plane element; elements 104A and 106A represent an exemplary E-plane element pair. FIG. 10 is an end view of the array 100 of FIG. 9 taken from the nose end of the missile, and illustrates the E-plane elements 104A, 104B, etc. The circumferential array can be positioned on the cylindrical portion 108 of the missile as shown in FIG. 9, or on the sloped surface region (see 109 of FIG. 11) of the nose. Keeping the ARH antennas on the cylindrical region 108 prevents their interference with other sensor combinations in the nose.

Typically, the cylindrical portion of the missile body is formed of a metallic, electrically conductive material, while the nose end or radome is fabricated of a dielectric material, e.g., from a sandwiched construction of reinforced Teflon skins and polyamide glass honeycomb.

Figure 11:
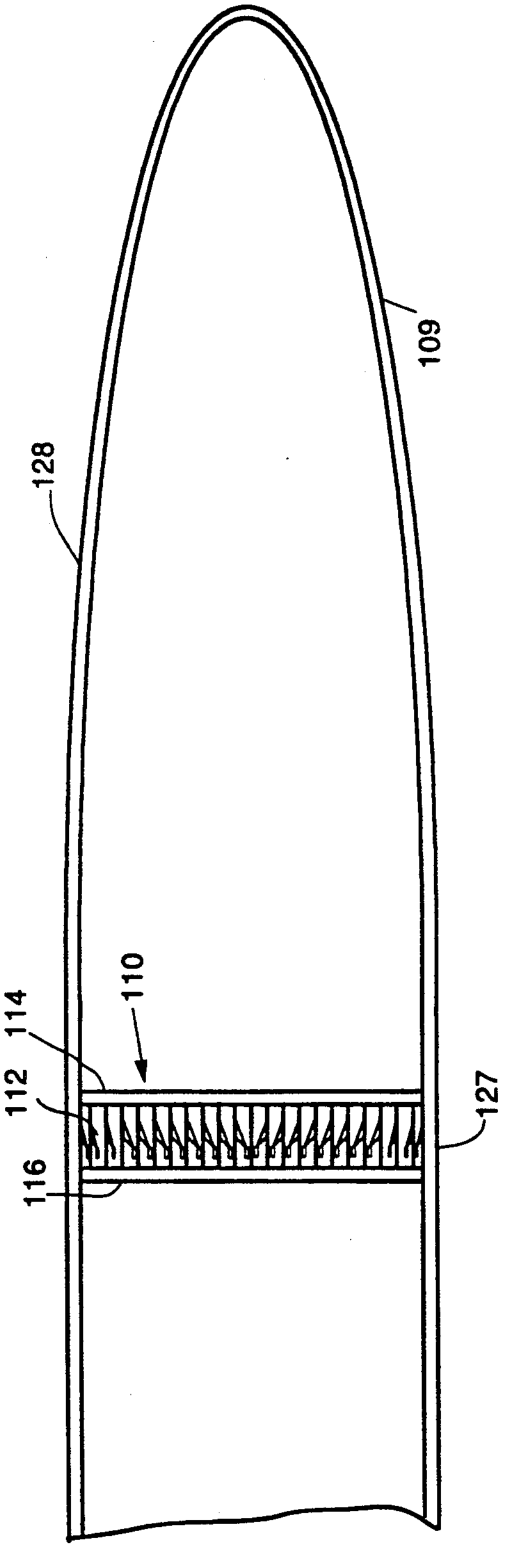

FIG. 11 is a broken-away side view of a missile 128 employing a circumferential array 110 of inclined flared notch radiating elements. In this example, the circumferential array is disposed in the cylindrical portion 127 of the missile body 128. The array 110 includes N H-plane inclined radiating elements 112, and N pairs of E-plane radiating elements 114 and 116, the elements of a given pair flanking a corresponding H-plane element.

Figure 12:
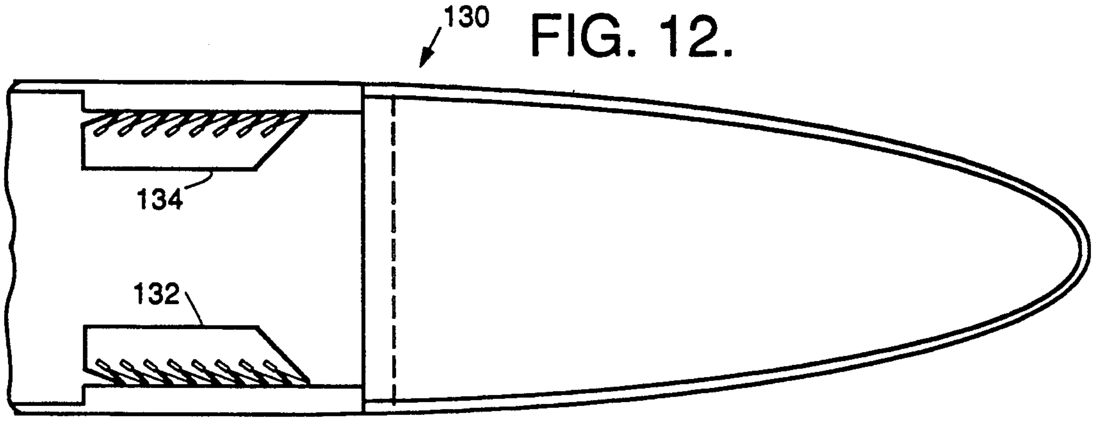
FIGS. 12–14 illustrate three exemplary arrangements of linear inclined element arrays within a missile body in accordance with the invention.
Figure 13:
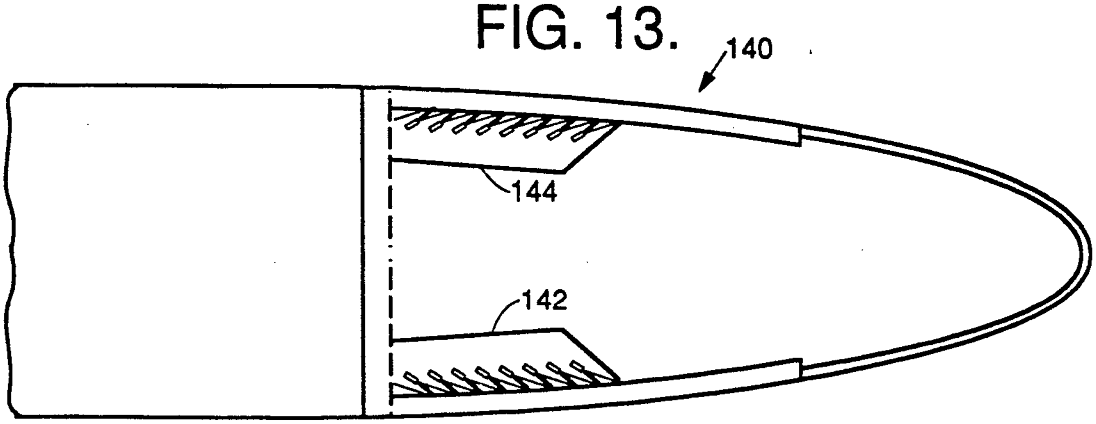
Figure 14:
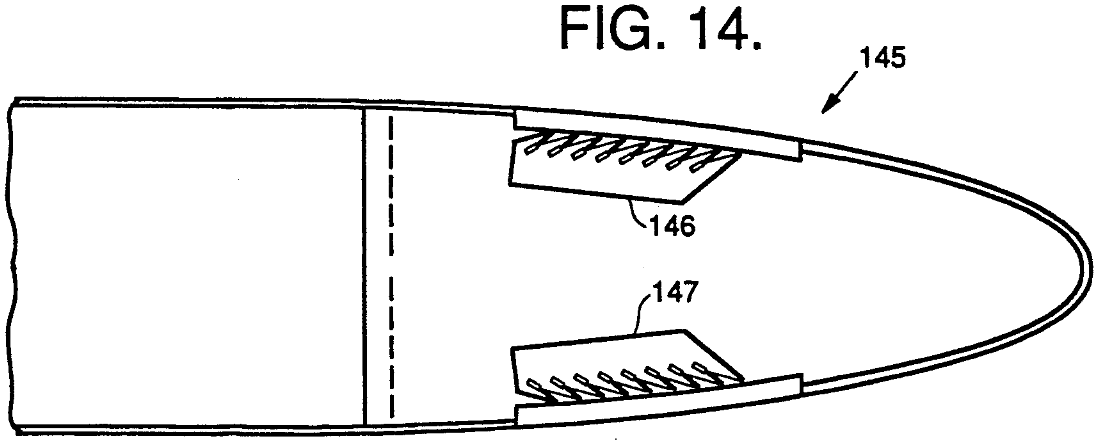

The linear arrays in accordance with the present invention can be positioned on the cylindrical portion, on the aft portion of the nose, or near the front of the nose while still leaving room within the nose for other sensors such as IR sensors. FIGS. 12–14 illustrate three exemplary arrangements.

FIG. 12 shows a missile 130 in side broken-away view, with longitudinal arrays 132 and 134 of inclined flared notch elements in accordance with the invention disposed adjacent to and conforming to the contour of the cylindrical portion of the missile body.

FIG. 13 illustrates a missile 140 wherein longitudinal arrays 142 and 144 are disposed in the aft portion of the missile nose and conform to the contour of the missile body.

FIG. 14 illustrates a missile 145 wherein longitudinal arrays 146 and 147 are disposed in the forward portion of the missile nose and conform to the contour of the missile body.

When the arrays in accordance with the invention are mounted in the nose section of the missile, it is not necessary that the entire nose section be fabricated of a dielectric material. Rather the nose can be of a metal skin with dielectric windows formed in the metal skin over the antenna arrays.

Operation of the Conformal Array

Consider the circular 360 degree circumferential array extending around the missile fuselage, as shown in FIGS. 15 and 16. The array 200 comprises both E and H plane elements, with the H-plane elements 201, 202 . . . shown in FIG. 15. The array 200 further comprises a switch 210 that allows selection of each H-plane element in the array and makes it possible for the processor 212 to compare the amplitude of the target's signal at each H-plane element. While shown as a single element, switch 210 actually comprises a switch for each H-plane element so that more than one element can be selected at any given time. Similarly, the outputs of the pairs of E-plane elements adjacent each H-plane element are combined and fed to a switch 230 which allows the processor 212 to select the E-plane element pair with the largest signal. For example, E-plane pair 220 and 221 adjacent H-plane element 201 are combined in combiner 222, and E-plane element 226 and 227 adjacent H-plane element 203 are combined in combiner 228. The signals from the respective combiners are fed into the switch 230, and the switch output fed to the processor 212. Here again, the switch 230 actually comprises a separate switch for each E-plane element pair, to allow more than one element pair to be selected at any given time.

The H-plane element or E-plane element pair with the highest signal indicates the best position for centering a subarray of 8, 10 or more elements for accurate target tracking. By comparing the amplitude of the E and H plane elements, one can determine which polarization to track with, i.e., either the E or H plane array elements. The outputs of the chosen elements for the array in the best performing polarization is directed into a conventional sum and difference network.

Figure 17:
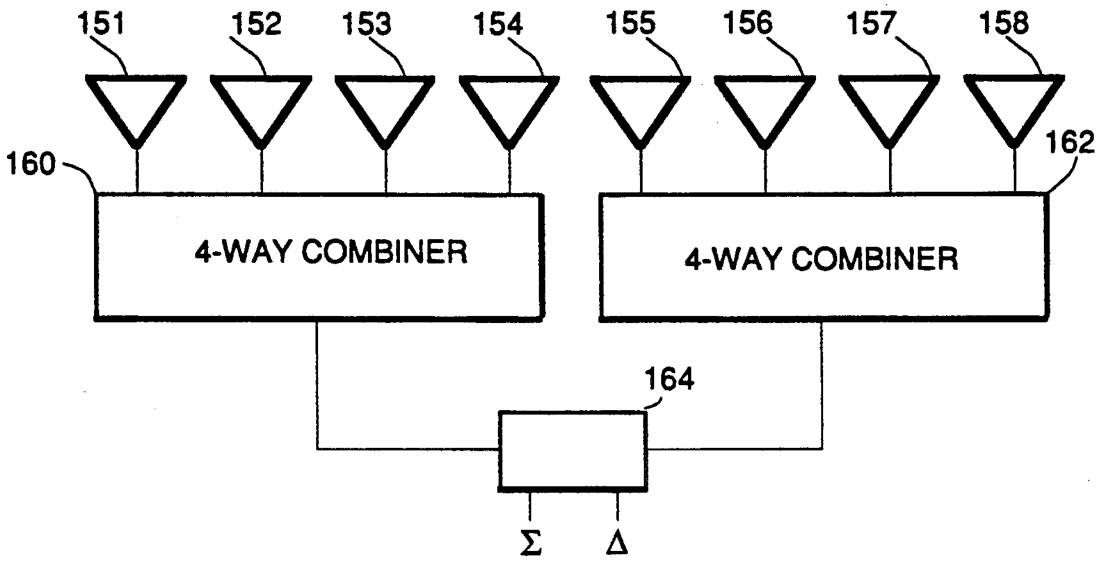
FIG. 17 illustrates the combining of a sub-array comprising selected ones of the elements of an inclined element array in accordance with the invention.

FIG. 17 shows a schematic diagram of an exemplary network of selected array elements. In this example, eight E or H plane pairs or elements are selected at positions 151–158 by either switch 210 or 230 to track the target. The element with the highest target signal is set at position 154 or 155 in the array. The signals from array element positions 151–154 are fed into a 4-way combiner 160, and the signals from array element positions 155–158 are fed into a second 4-way combiner 162. The outputs of the respective combiners are fed to a circuit 164 which develops the sum and difference of the respective combined signals from combiners 160 and 162. The circuit 164 can comprise, for example, a magic Tee or 180 degree hybrid circuit.

Now consider an axial or longitudinal array. There are two configurations, one having 2 H-plane elements and one E-plane element. The other has two E-plane and one H-plane element. Both configurations require that the pairs be tied together to form a phase center between them. These paired elements are treated as one element in the array. A phase progressive phase shift is used to scan the array.

Figure 18:
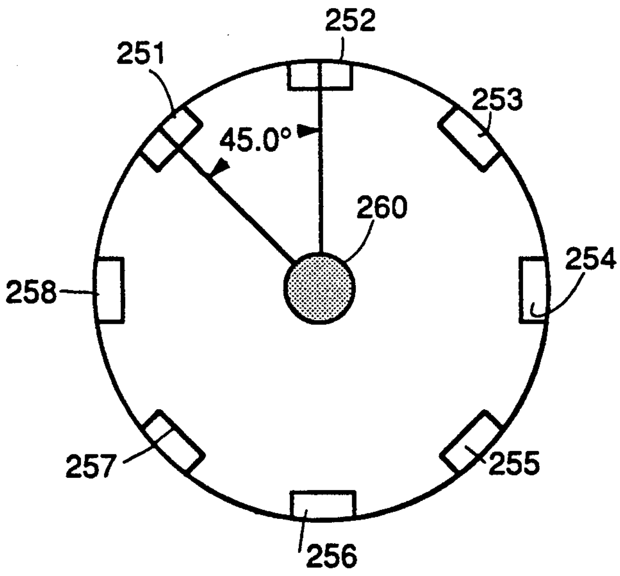
FIG. 18 is an end view of a missile illustrating the arrangement of longitudinal arrays of inclined elements in accordance with the invention.

A plurality of longitudinal arrays are typically spaced at 45 or 90 degrees increments about the missile fuselage. The amplitude from each longitudinal array is sampled by the processor. The array with the strongest signal is selected to do the tracking. Thus, in FIG. 18, longitudinal arrays 251–258 are spaced in 45 degree increments about the missile fuselage. The signal from each array is fed to a multiplexing switch 260 whose output is fed to the processor.

Figure 19:
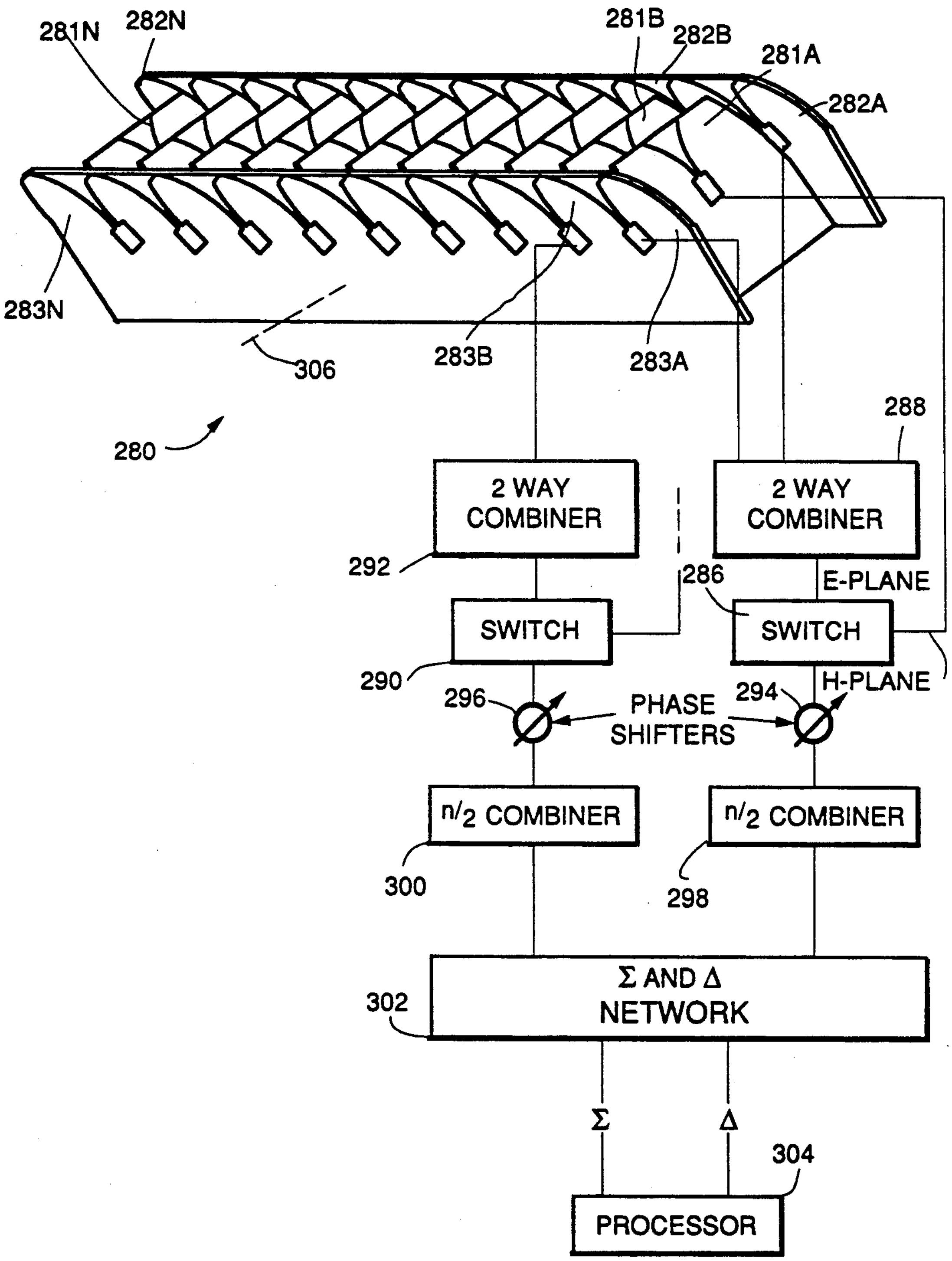
FIG. 19 is a schematic diagram illustrative of a dual polarization array system employing a longitudinal array of inclined elements, comprising N pairs of E-plane elements and N H-plane elements.

FIG. 19 is a schematic block diagram illustrative of an exemplary longitudinal array 280, comprising N H-plane elements and corresponding N pairs of E-plane elements. The E-plane element pairs 282A and 283A, 282B and 283B . . . 282N and 283N are respectively connected to 2-way combiners to combine the signal contributions from each E-plane pair element; exemplary combiners 288 and 292 are shown in FIG. 19. The combiner outputs are fed to a multiplexing switch which selects between the E-plane combiner or the corresponding H-plane element. Thus, for example, H-plane element 281A is connected to switch 286, which selects between the H-plane element 281A and E-plane combiner 288 output. Switch 290 selects between the output of 2-way combiner 292 and H-plane element 281B.

The switch outputs are then fed to respective variable phase shifters 294, 296 . . . , and fed into one of two N/2 combiner networks 298 and 300. The elements on one side of the longitudinal array center line 306 are fed to combiner 298, and those on the other side of the line are fed to combiner 300. The combiner outputs are fed to a sum and difference network 302, and the respective sum and difference signals are sent to the processor 304. The processor 304 selects the E or H plane elements to scan for the target, and uses the phase scan angle and the sum and difference signal data to identify the target location or bearing.

Figure 20:
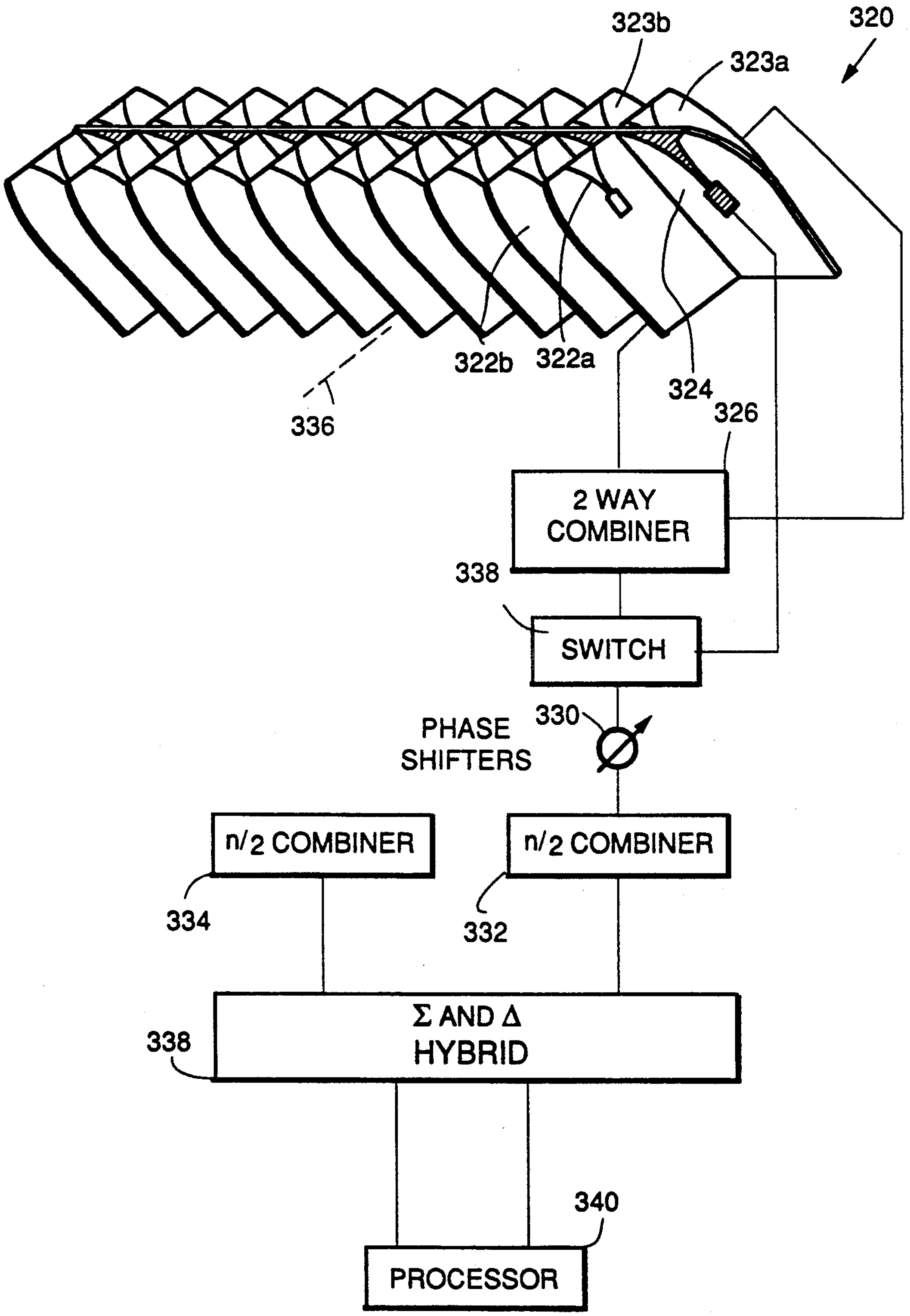
FIG. 20 is a schematic diagram illustrative of a dual polarization array system employing a longitudinal array of inclined elements, comprising N pairs of H-plane elements and N E-plane elements.

FIG. 20 is a schematic diagram illustrating a longitudinal array 320 employing N E-plane elements and 2N H-plane except it is the H-plane element pairs whose outputs are combined in a 2-way combiner, and multiplexed with the output of the corresponding E-plane element. Thus, H-plane elements 322A and 323A are connected to a 2-way combiner 326. Multiplexing switch 328 selects either the output of the combiner 326 or the E-plane element 324. The selected output is then fed to a variable phase shifter 330, and the phase shifted output is fed into an N/2 combiner network 332. The elements on the other side of the array center line 336 are combined in N/2 combiner 334. The respective N/2 combiner outputs are sent to a sum and difference circuit 338, and the sum and difference output data is sent to the processor 340. Here again, the processor selects the E or H plane to scan for the target, depending on the target's polarization. The processor 340 employs the scan angle and the sum and difference signal data to identify the target location.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. An antenna array for a missile, said missile characterized by a boresight, the array comprising a plurality of aligned flared notch antenna elements, each said element inclined toward boresight of said missile to improve directivity of said array in the direction of boresight.

2. The array of claim 1 further characterized in that said antenna elements are disposed within said missile adjacent an exterior surface of the missile and arranged to conform to the contour of the exterior surface of the missile.

3. The array of claim 2 further characterized in that said array is disposed in a circumferential arrangement about said missile.

4. The array of claim 2 further characterized in that said array is arranged longitudinally along the missile.

5. The array of claim 1 wherein said antenna elements comprise a set of H-plane antenna elements inclined toward boresight.

6. The array of claim 1 wherein said antenna elements comprise a set of E-plane antenna elements inclined toward boresight.

7. The array of claim 6 wherein said E-plane antenna elements are further characterized as symmetrical flared notch antenna elements.

8. The array of claim 6 wherein said E-plane antenna elements are further characterized as asymmetrical flared notch antenna elements.

9. The array of claim 1 further characterized in that said array is dual polarized, in that it comprises a set of H-plane antenna elements inclined toward boresight and a set of E-plane antenna elements inclined toward boresight.

10. The array of claim 9 wherein said set of H-plane antenna elements comprises N H-plane elements and said set of E-plane antenna elements comprises N pairs of E-plane elements, the members of each E-plane element pairs flanking a respective one of said H-plane elements.

11. The array of claim 9 wherein said set of E-plane elements comprises N elements, and said set of H-plane elements comprises N pairs of H-plane elements, and wherein each E-plane element is positioned between a corresponding pair of H-plane elements.

12. The array of claim 1 wherein said antenna elements are further characterized as flared notch slotline elements.

13. A passive radar array system for detecting the location of a target in respect to a missile boresight, comprising:

a circumferential array of flared notch antenna elements disposed about the circumference of a missile, said elements inclined toward boresight to improve directivity in the direction of boresight;

a radar processor responsive to signals received from said array to determine the target location in relation to the missile boresight; and means for selectively coupling the signals from selected ones or groups of ones of said antenna elements to said radar processor to permit the processor to determine the particular antenna having the highest output signal and to form a receiving subarray comprising said particular antenna element and a number of adjacent antenna elements.

14. The array system of claim 13 wherein said circumferential array comprises a set of H-plane antenna elements inclined toward the missile boresight.

15. The array system of claim 13 wherein said circumferential array comprises a set of E-plane antenna elements inclined toward the missile boresight.

16. The array system of claim 13 wherein said circumferential array is dual polarized, in that it comprises a set of H-plane antenna elements inclined toward boresight and a set of E-plane antenna elements inclined toward boresight.

17. The array system of claim 16 wherein said set of H-plane antenna elements comprises N H-plane elements and said set of E-plane antenna elements comprises N pairs of E-plane elements, the members of each E-plane element pair flanking a respective one of said H-plane elements.

18. The array system of claim 13 wherein said means for selectively coupling the signals from selected ones or groups of ones of said antenna elements comprises a switching means for selectively switching the signal from a selected antenna element to said processor, thereby enabling said processor to isolate the signal from respective antenna elements.

19. The array system of claim 18 wherein said selective coupling means further comprises a first combining network for selectively combining the signals from a first selected group of antenna elements adjacent said element producing said highest output signal, and a second combining network for selectively combining the signals from a second selected group of antenna elements adjacent said element producing said highest output signal, and a circuit responsive to the outputs from said first and second combining networks for producing respective sum and difference signals therefrom.

20. In a missile, a passive radar array system for detecting the location of a target, comprising:

a longitudinal array of flared notch antenna elements disposed longitudinally along a portion of exterior surface of said missile, said elements inclined toward boresight to improve directivity in the direction of boresight;

a radar processor responsive to signals received from said array elements to determine the target location; and means for electronically scanning a beam formed by said longitudinal array to locate said target.

21. The array system of claim 20 wherein said longitudinal array is dual polarized, and comprises a first array of H-plane elements inclined toward the missile boresight, and a second array of E-plane elements inclined toward the missile boresight, wherein each E-plane element has a generally orthogonal orientation relative to a corresponding H-plane element, and wherein said electronic scanning means comprises means for scanning an H-plane beam formed from said array of H-plane elements and means for scanning an E-plane beam formed from said array of E-plane elements.

22. The array system of claim 21 wherein said array of H-plane elements comprises N H-plane elements and said array of E-plane elements comprises N pairs of E-plane elements, and wherein the elements comprising each pair are disposed to flank a corresponding H-plane element.

23. The array system of claim 21 wherein said array of E-plane elements comprises N elements, and said array of H-plane elements comprises N pairs of elements, each pair aligned along said longitudinal array, and wherein each E-plane element is disposed between the elements of a corresponding H-plane element pair.

24. The array system of claim 20 wherein said missile is characterized by a cylindrical body portion and a tapered nose portion, and wherein said longitudinal array is disposed along said cylindrical body portion.

25. The array system of claim 20 wherein said missile is characterized by a tapered nose portion, and wherein said longitudinal array is disposed within said nose portion and conforms to the shape of the exterior surface of said missile.

* * * * *